United States Patent Office 2,996,868
Patented Aug. 22, 1961

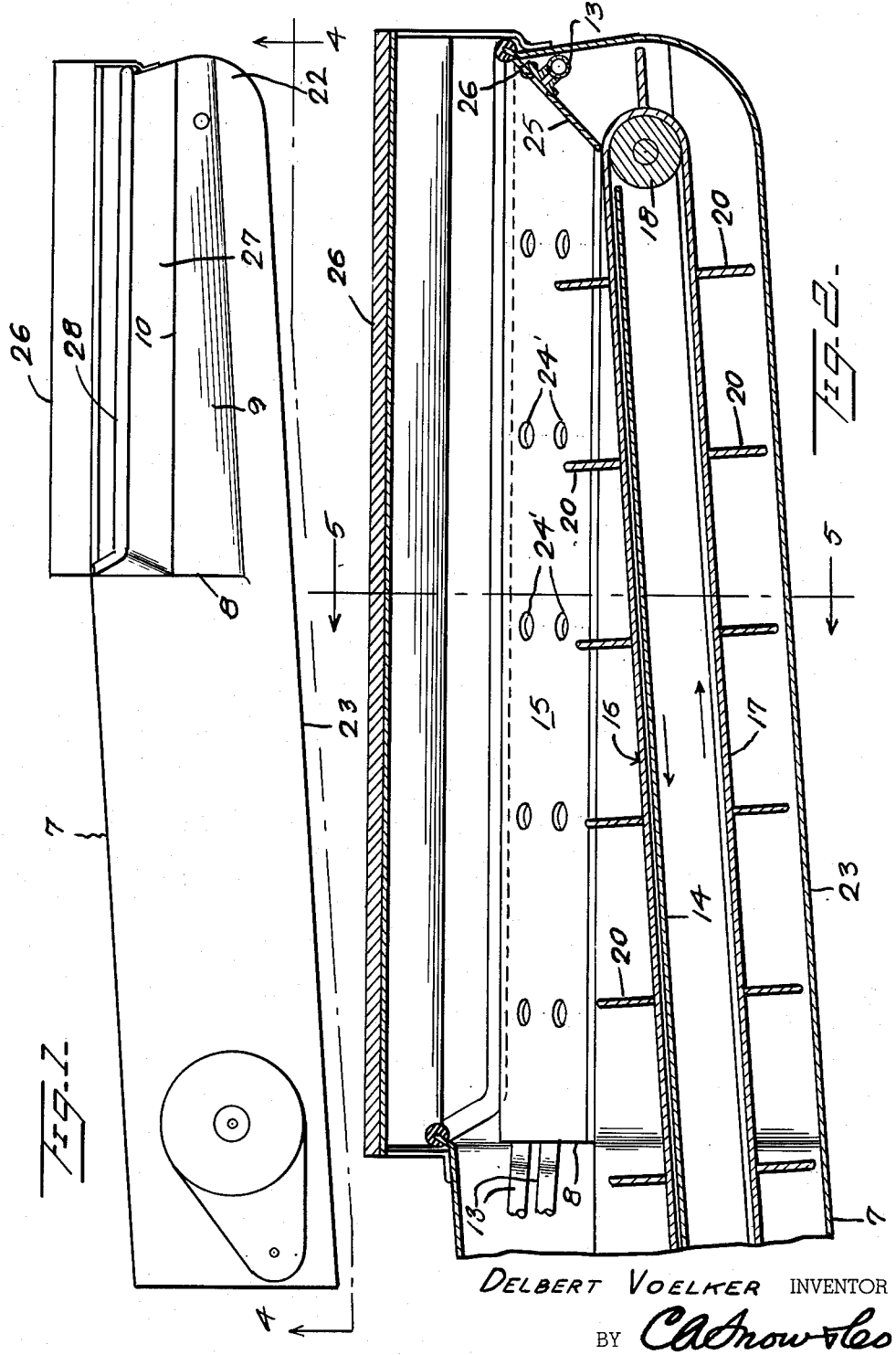
Aug. 22, 1961  D. M. VOELKER  2,996,868
PNEUMATIC FRUIT HARVESTER
Filed July 7, 1959  3 Sheets-Sheet 1
DELBERT VOELKER INVENTOR
BY *CA Snow Heo.*
ATTORNEYS.

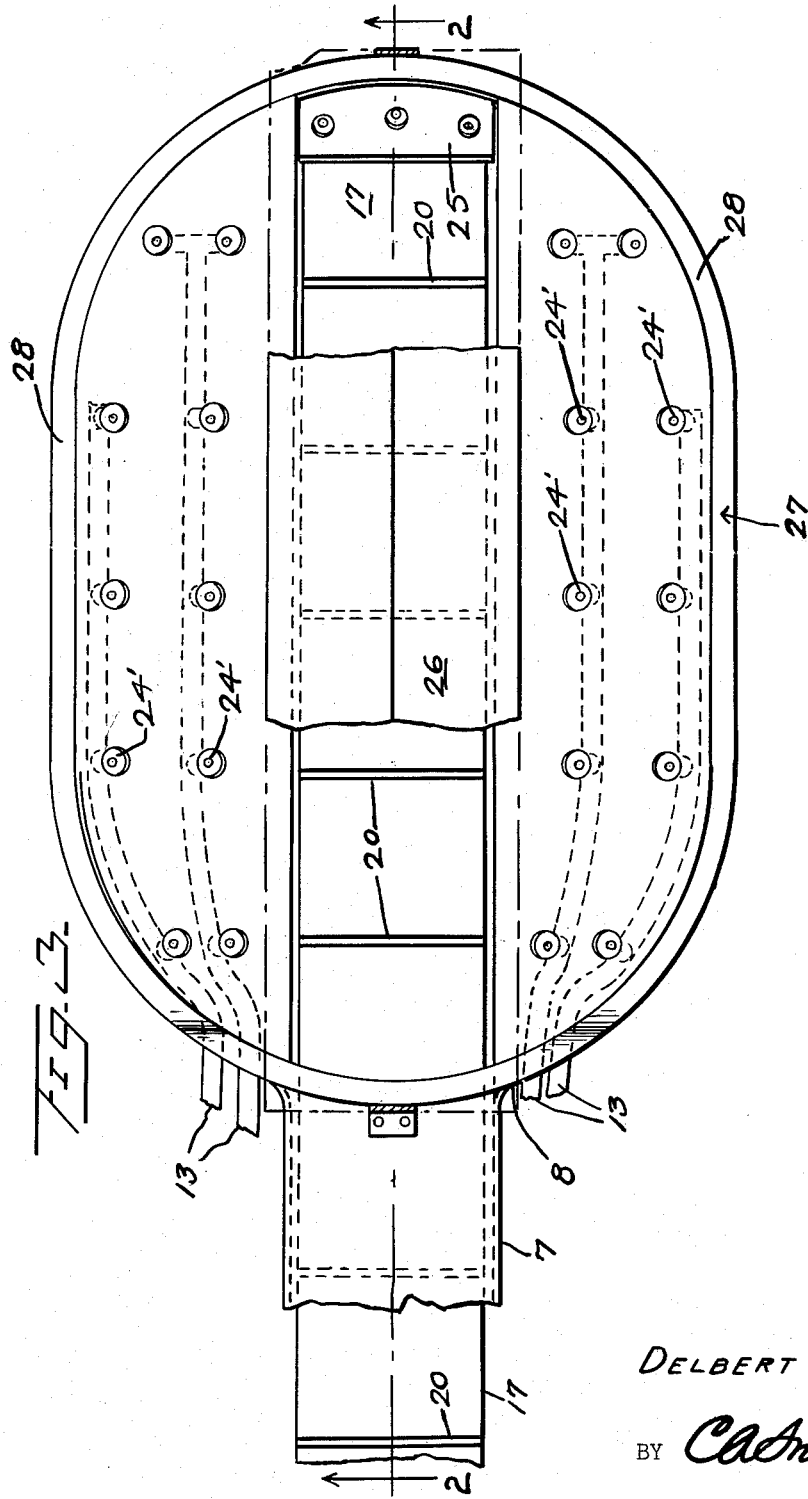

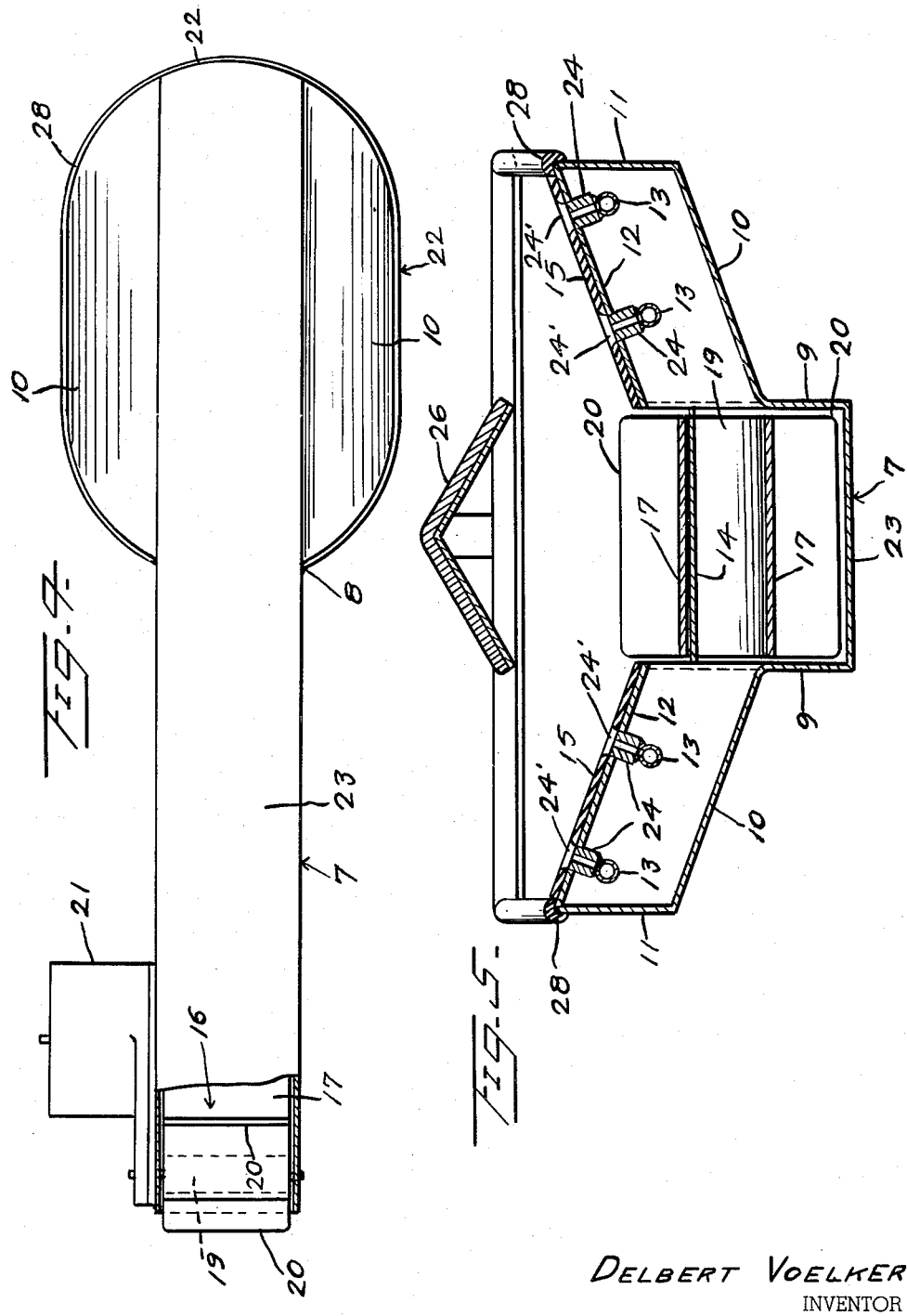

2,996,868
PNEUMATIC FRUIT HARVESTER
Delbert M. Voelker, Rte. 2, Box 384, Wapato, Wash.
Filed July 7, 1959, Ser. No. 825,480
2 Claims. (Cl. 56—328)

This invention relates to a fruit picking machine and more particularly to such a machine in which blasts of compressed air are used to dislodge the fruit from the branches. It is well known that ripe fruit of some types, such as apples, pears and peaches will fall from the branches when the latter are swayed by even a slight breeze. This invention provides an arrangement for artificially producing by compressed air jets a greater wind effect than that exerted by any ordinary breeze for dislodging fruit from the trees.

A primary object of the present invention is to provide a fruit picking apparatus in which the fruit is dislodged from the branches of the tree by pushing it upward from the hanging position to an upright position through intermittent jets of air from nozzles.

A further object of the present invention is to provide a fruit picking apparatus for dislodging the fruit from the branches of a tree by jets of compressed air from nozzles including an endless conveyor for receiving the dislodged fruit and carrying it to a suitable container or truck for removal.

An additional object of the invention is to provide a portable fruit picking machine that can be readily located under fruit bearing trees or bushes from which it is desired to obtain the fruit, in a minimum of time, and with a minimum of effort.

Another object of this invention is to provide a portable fruit picking machine that will pick the fruit without injuring the tree or bush, and also without bruising or destroying the fruit as it is being picked.

Another object of this invention is to provide a portable fruit picking machine that can be used for picking any kind of fruit from its place of growth.

Another object of this invention is to provide a fruit picking machine that cannot become clogged and therefore inoperative from branches of fruit trees or bushes or from picked fruit falling into its operating mechanism.

Still another object of this invention is to provide a portable fruit picking machine that does not require any technical or mechanical skill to maintain, and wherein the mechanism embodies parts that may be readily purchased on the open market.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIGURE 1 is a side elevational view of this invention.

FIG. 2 is an enlarged sectional view taken substantially along line 2—2 of FIG. 3 as viewed in the direction indicated by the arrows.

FIG. 3 is an enlarged fragmentary plan view of this invention.

FIG. 4 is an external view with parts broken away and shown in section of this invention taken substantially along line 4—4 of FIG. 1 as viewed in the direction indicated by the arrows.

FIG. 5 is a sectional view taken substantially along line 5—5 of FIG. 2 as viewed in the direction indicated by the arrows.

Similar reference characters refer to similar parts throughout the several views of the drawings.

Having reference now to the drawings in detail, and in particular to FIG. 4, there is generally indicated at 22 a body of sheet metal and of flattened oval shape having a trough or chute 7 along its longitudinal axis, the sheet metal being thick enough to hold its formed shape without the necessity of providing a supporting framework. The trough is seen to be substantially U-shaped in configuration when viewed from the end. The trough 7 merges with the flattened oval body 22 at a point indicated on the drawings by the reference numeral 8. The body 22 comprises a fruit collecting scoop. Along the longitudinal axis of the body 22, the trough is of rectangular cross section as clearly shown in FIG. 5 of the appended drawings, wherein it is seen that the aforesaid flattened oval enlargement is made by each side member 9 being flared outwardly at an angle into a panel 10 whose upper end is formed into a vertically extending side wall 11, the wall 11 being curved inwardly as viewed in plan form, until it intersects at the point 8 with the aforesaid trough 7, as has already been clearly stated.

Upper panels 12 forming wings are parallel to the panels 10 and are secured to the upper edges of side members 9 and side walls 11, thereby forming box-like structures in which air supply lines 13 are located, as will be hereinafter described.

A conveyor supporting panel 14, rectangular shape, when viewed in plan, is secured within the trough 7, the point of securement being slightly below the top edges of the said trough, as will be seen in FIG. 5 of the drawings. The adding of the supporting panel 14 to the herein described trough 7 creates a box-like structure having a trough at its top rather than a true trough-like structure. The reference character 7 will continue to designate this entire apparatus as a trough.

Rubber pads 15 are placed on the tops of the upper panel 12 preventing fruit from becoming bruised when it falls from the tree or bush after being dislodged by the blast of air from air supply tube 13.

A conventional conveyor 16, embodying an endless belt 17, idler supporting pulley 18 and a driving pulley 19, is mounted within the stated trough 7, as can be best seen from examination of FIGS. 2 and 5 of the drawings. This conventional conveyor belt has a plurality of vertically extending cleats 20 secured thereto in longitudinal spaced relation to each other, both the cleats and their method of attachment to the endless belt being conventional and well known to those experienced in the art. The endless belt conveyor in this apparatus may be driven by any desired means, such as an internal combustion engine or an electric motor, the latter means being shown in FIG. 4 of the appended drawings, wherein it is designated by the reference character 21. Referring back to the head end 22 of this portable fruit picking machine, it will be seen that the trough-like structure 7 has this head end 22 closed by reason of the fact that a bottom plate 23 is curved upwardly to form the described head end of this apparatus. The other end is left open so that whatever fruit is being picked will fall off the end of conveyor belt 17 into a hopper, or its equivalent.

Brief mention has already been made of the air supply lines 13. These lines connect to a plurality of nozzles 24 that project through openings 24' in rubber pads 15, as well as through openings in the panels 12 to the under sides of which the nozzles are secured. Some of the nozzles 24 are secured to the under side of a rubber flap 25 at the head end 22 in the manner clearly illustrated by FIG. 2 of the drawings. The purpose of this flap, which is hingedly secured along its top edge 26' to the head end 22 of the trough, is to prevent the picked fruit from falling onto the plate 23 forming the bottom of the trough.

The air supply lines 13 connect with a source of compressed air supply not shown, so that air under pressure may be discharged through nozzles 24 and directed against the fruit, dislodging the fruit from its branches.

A roof-like structure 26 is placed over that part of the conveyor 16 that is in the enlarged portion 27 of the apparatus. This roof-like structure 26 is in the form of an inverted V when viewed from the end, and its purpose is to protect fruit on the conveyor from damage by other fruit as it falls, after being blasted from the tree or bush by air coming out of the nozzles 24.

The fact that upper panels 12 of this machine slope downwards and inwards toward the conveyor belt causes fruit which may fall on the rubber pads 15 to slide or roll onto the conveyor. The entire upper edge of the enlarged portion 27 is covered with a padding 28 to prevent damage to falling fruit, as well as to prevent damage to either the machine itself or any object that it may accidentally strike as it is moved from place to place. Although FIG. 5 shows some members for supporting the roof-like structure 26 and for breaking the fall of the fruit onto the outer portion of the enlarged part of this apparatus, no further mention or claim for these supports is made in this specification, as they may be of any desired shape, and can be constructed according to any good mechanical practice.

In operation the apparatus is moved to a position under a tree from which fruit to be harvested is growing, the wide or scoop end of the trough being moved so that the scoop end is directly under the fruit laden branches. Air under pressure is directed against the fruit through nozzles 24, dislodging the fruit, which falls by gravity onto the endless conveyor belt which delivers the fruit to a container or receiving bin at one end of the machine.

All of the basic elements of the fruit picking machine have now been described with the exception of any handles, legs or other attachments, none of which are shown in the drawings, for supporting the apparatus when it is in use. This can be done according to the desire of the operator. One suggested way of handling this fruit picking machine is to place it on the body of an open-end truck and back it up under the tree from which the fruit is to be picked. The truck will of course have adequate room not only for the picked fruit, but also for the air compressor and apparatus for operating the conveyor. This apparatus may also have legs adapted to it so that it may be set firmly on the ground wherever there are trees or bushes from which fruit is to be picked.

From the foregoing it will now be seen that there is herein provided a portable fruit picking apparatus which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

1. A fruit picking apparatus comprised by an elongated body, said body having a trough therein adjacent one end thereof and along its longitudinal axis, an endless conveyor positioned in the trough for travel lengthwise of same, wings on the sides of said trough inclined upwardly and outwardly, nozzles in said wings positioned to emit air jets along lines upwardly and inwardly inclined, and compressed air lines to said nozzles.

2. A fruit picking apparatus comprised by an elongated body, said body having a trough therein adjacent one end thereof and along its longitudinal axis, an endless conveyor positioned in the trough for travel lengthwise of same, a roof of inverted V-shape supported on the body above the trough and the conveyor having its eaves approximately coinciding with the outlines of said trough and conveyor, wings on the sides of said trough inclined upwardly and outwardly, nozzles in said wings positioned to emit air jet along lines upwardly and inwardly inclined, and compressed air lines to said nozzles.

References Cited in the file of this patent

UNITED STATES PATENTS

| | | |
|---|---|---|
| 2,692,470 | Boman | Oct. 26, 1954 |
| 2,710,516 | Kaesemeyer | June 14, 1955 |
| 2,718,744 | Phillips | Sept. 27, 1955 |
| 2,782,943 | Jones et al. | Feb. 26, 1957 |

FOREIGN PATENTS

| | | |
|---|---|---|
| 595,502 | France | July 18, 1925 |
| 1,176,286 | France | Nov. 14, 1958 |